United States Patent
Ray

(10) Patent No.: US 8,077,833 B2
(45) Date of Patent: Dec. 13, 2011

(54) METHOD FOR SENDING A PREVIOUSLY RECORDED PERSONALIZED MESSAGE TO A CALLER BY A NETWORK VOICE MAIL SYSTEM

(75) Inventor: Amar Nath Ray, Shawnee, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 728 days.

(21) Appl. No.: 12/180,183

(22) Filed: Jul. 25, 2008

(65) Prior Publication Data

US 2010/0020944 A1    Jan. 28, 2010

(51) Int. Cl.
*H04M 1/64* (2006.01)

(52) U.S. Cl. ............ 379/87; 379/88.12; 379/88.22; 379/93.23; 379/201.01; 379/220.01; 455/412.1; 455/466; 704/235; 704/270; 705/40

(58) Field of Classification Search ............ 379/87, 379/88.12, 88.14, 88.22, 93.23, 201.01, 220.01; 455/466, 412.1; 704/235, 270; 705/40
See application file for complete search history.

(56) References Cited

U.S. PATENT DOCUMENTS

| | | | | |
|---|---|---|---|---|
| 5,475,738 A | * | 12/1995 | Penzias | 379/88.14 |
| 5,870,454 A | * | 2/1999 | Dahlen | 379/88.14 |
| 6,104,789 A | * | 8/2000 | Lund | 379/93.23 |
| 6,651,042 B1 | * | 11/2003 | Field et al. | 704/270 |
| 7,024,209 B1 | * | 4/2006 | Gress et al. | 455/466 |
| 7,035,385 B2 | * | 4/2006 | Levine et al. | 379/88.23 |
| 7,043,232 B2 | * | 5/2006 | Pelaez et al. | 455/412.1 |
| 7,099,453 B2 | * | 8/2006 | Crockett et al. | 379/220.01 |
| 7,961,853 B2 | * | 6/2011 | Voticky et al. | 379/88.23 |
| 2005/0013419 A1 | * | 1/2005 | Pelaez et al. | 379/88.14 |
| 2005/0201534 A1 | * | 9/2005 | Ignatin | 379/88.22 |
| 2007/0260456 A1 | * | 11/2007 | Proux et al. | 704/235 |
| 2008/0107244 A1 | * | 5/2008 | Setzer et al. | 379/88.12 |
| 2008/0170678 A1 | * | 7/2008 | Davoust et al. | 379/201.01 |
| 2010/0020944 A1 | * | 1/2010 | Ray | 379/87 |
| 2010/0023451 A1 | * | 1/2010 | Lambert et al. | 705/40 |

* cited by examiner

*Primary Examiner* — Gerald Gauthier
(74) *Attorney, Agent, or Firm* — Patton Boggs LLP

(57) ABSTRACT

An embodiment of a method for providing a personalized greeting to a caller includes receiving an incoming call addressed to a first communication device from a caller using a second communication device, and determining a received caller identifier associated with the second communication device. The method further includes determining if the received caller identifier matches a pre-assigned caller identifier from a pre-assigned caller list. If the received caller identifier matches a pre-assigned caller identifier the method further includes playing an outgoing audio message associated with the pre-assigned caller identifier, recording an audio message from the caller, converting the audio message into a text message, and sending the text message to a user associated with the first communication device.

18 Claims, 6 Drawing Sheets

US 8,077,833 B2

METHOD FOR SENDING A PREVIOUSLY RECORDED PERSONALIZED MESSAGE TO A CALLER BY A NETWORK VOICE MAIL SYSTEM

BACKGROUND

Network voicemail systems provide voicemail services to users of communication devices. These voicemail systems allow a caller to leave a voicemail for a user if the user is not available to answer a call from the caller. If the user does not answer an incoming call from the caller, the network voicemail system provides a pre-recorded greeting to the caller, and prompts the caller to leave an incoming message for the user. In existing network voicemail systems, the same pre-recorded greeting is played to every caller regardless of their identity.

SUMMARY

Embodiments of the invention allow for a user of a first communication device to record a personalized outgoing audio message using a network voicemail system, and associate the personalized outgoing audio message with a pre-assigned caller identifier associated with a second communication device. Embodiments further allow a user to send a text message including personalized outgoing message text to the voicemail system, and convert the personalized outgoing message text into the personalized outgoing audio message associated with the pre-assigned caller identifier. If the caller using the second communication device places a call to the user of first communication device and the user fails to answer the call, the network voicemail system plays the personalized outgoing audio message to the caller and prompts the caller to record an audio reply message to the user. In various embodiments, the user may access the network voicemail system and listen to the audio reply message. In other embodiments, the user may choose to have the network voicemail system convert the audio reply message into a text reply message and send the text reply message to the user via a communication device, such as the first communication device.

An embodiment of a method for providing a personalized greeting to a caller includes receiving an incoming call addressed to a first communication device from a caller using a second communication device, and determining a received caller identifier associated with the second communication device. The method further includes determining if the received caller identifier matches a pre-assigned caller identifier from a pre-assigned caller list. If the received caller identifier matches a pre-assigned caller identifier the method further includes playing an outgoing audio message associated with the pre-assigned caller identifier, recording an audio message from the caller, converting the audio message into a text message, and sending the text message to a user associated with the first communication device.

An embodiment of a method for assigning a personalized greeting to a caller includes receiving a text message from a first communication device, and determining a pre-assigned caller identifier from the text message. The method further includes determining outgoing message text from the text message. The method still further includes converting the outgoing message text into an outgoing audio message, and associating the outgoing audio message with a pre-assigned caller identifier.

An embodiment of a method for providing a personalized text greeting to a caller includes receiving an incoming call addressed to a first communication device from a caller using a second communication device, and determining a received caller identifier associated with the second communication device. The method further includes determining if the received caller identifier matches a pre-assigned caller identifier from a pre-assigned caller list, and if the received caller identifier matches a pre-assigned caller identifier, sending an outgoing text message associated with the pre-assigned caller identifier to the caller.

BRIEF DESCRIPTION

Illustrative embodiments of the present invention are described in detail below with reference to the attached drawing figures, which are incorporated by reference herein and wherein.

DETAILED DESCRIPTION

Figure 1:
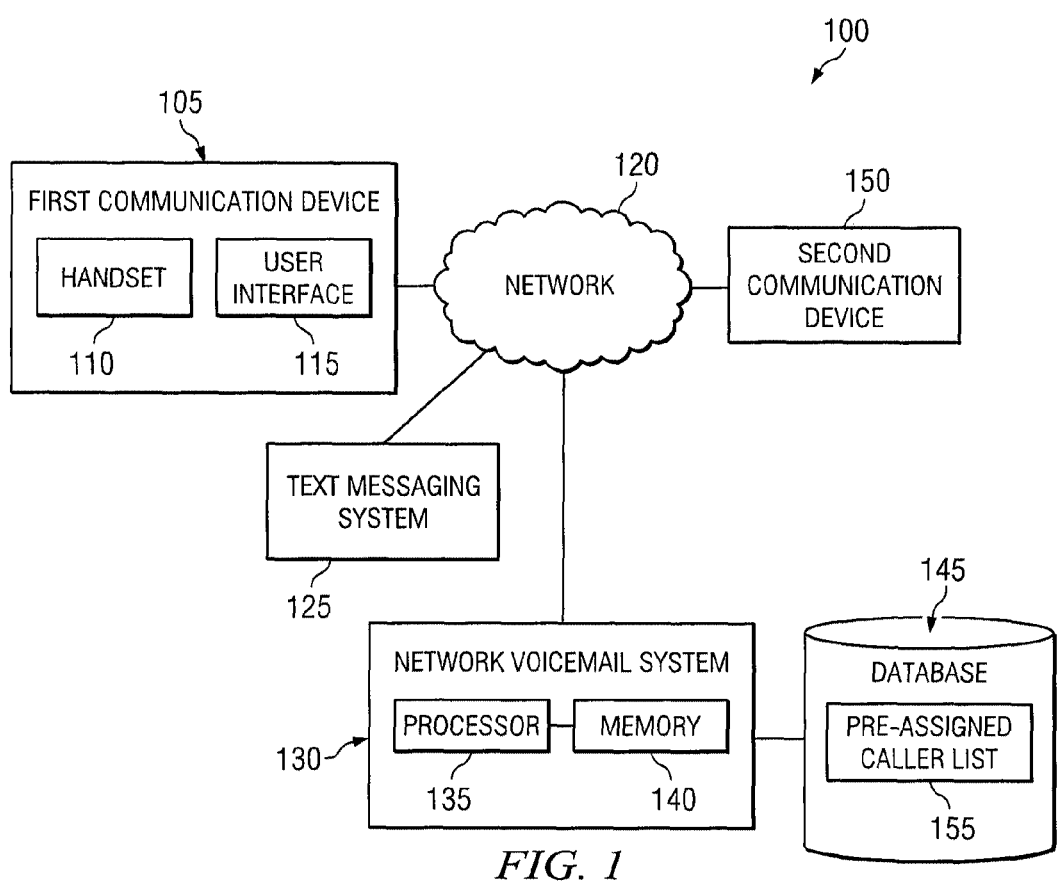
FIG. 1 illustrates an embodiment of a system for identifying an incoming caller and playing back a previously recorded personalized outgoing message to the incoming caller.

FIG. 1 illustrates an embodiment of an illustrative system 100 for identifying an incoming caller and playing back a previously recorded personalized outgoing message to the incoming caller. The system 100 includes a first communication device 105. The first communication device 105 is configured to allow a user to initiate, receive, and participate in communication sessions, such as telephone calls, with other communication devices in communication with one or more communication networks. In at least one embodiment, the first communication device 105 is a telephone. In a particular embodiment, the first communication device 105 is a mobile phone. The first communication device 105 includes a handset 110 and a user interface 115. In at least one embodiment, the user interface 115 is a keypad. In at least one embodiment, the handset 110 includes a microphone, speaker, and/or earpiece. The first communication device 105 is in communication with a network 120. In at least one embodiment, the network 120 is a telephone network.

The system 100 may further include a text messaging system 125 in communication with the network 120. The text messaging system 125 is configured to support the sending and receiving of text messages between devices coupled to the network 120. The system 100 may further include a network voicemail system 130 in communication with the network 120. The voicemail system 130 may alternatively be located at a customer premise equipment (CPE). The network voicemail system 130 includes a processor 135 and a memory 140. The memory 140 is configured to store computer instructions operable to cause the processor 135 to perform the various functions of the network voicemail system 130 described herein. In at least one embodiment, the network voicemail system 130 is configured to provide voicemail services to one or more communication devices coupled to the network 120, such as the first communication device 105.

The system 100 further includes a database 145 in communication with the network voicemail system 130. In at least one embodiment, the database 145 is configured to store one or more voicemails associated with the first communication device 105. In at least one embodiment, the database 145 is further configured to store at least one personalized outgoing message recorded by the user of the first communication device 105. In some embodiments, the database 145 is further configured to store incoming messages from callers or reply messages addressed to the user of the first communication device 105.

The system 100 further includes a second communication device 150 in communication with the network 120. The second communication device 150 may be configured to allow a caller to initiate and participate in communication sessions, such as telephone calls with the first communication device 105. The second communication device 150 may further be configured to leave voicemails or audio reply messages to the user of the first communication device 105. In at least one embodiment, the second communication device 150 is a telephone.

In an example operation of the system 100, the user of the first communication device 105 records a personalized outgoing audio message using the network voicemail system 130 via the first communication device 105. In at least one embodiment, the user speaks the personalized outgoing audio message into the handset 110 of the first communication device 105. The network voicemail system 130 then associates the personalized outgoing audio message with a pre-assigned caller identifier associated with the second communication device 150 in response to user input via the user interface 115. In one embodiment, the pre-assigned caller identifier is a phone number associated with the second communication device 150. In another embodiment, the pre-assigned caller identifier is a caller name associated with the second communication device 150. In still other embodiments, more than one caller identifiers can be associated with the second communication device 150. For example, both a phone number and a caller name may be associated with the second communication device 150. In still another embodiment, the user may provide the pre-assigned caller identifier by speaking a name and/or phone number associated with the second communication device 150 into the handset 110 of the first communication device 105.

In another example operation of the system 100, the user of the first communication device 105 composes a text message containing a pre-assigned caller identifier and outgoing message text within a text message and sends the text message to the network voicemail system 130. Upon receiving the text message, the network voicemail system 130 converts the outgoing message text into a personalized outgoing audio message and associates the personalized outgoing audio message with the pre-assigned caller identifier contained in the text message.

In each of the example operations described above, the network voicemail system 130 stores the personalized outgoing audio message in the database 145. When a caller using the second communication device 150 initiates a call to the first communication device 105, and the user of the first communication device 105 is unavailable to answer the call, the network voicemail system 130 determines a received caller identifier associated with the caller, matches the received caller identifier to the pre-assigned caller identifier, and plays the personalized outgoing audio message associated with the pre-assigned caller identifier to the caller of the second communication device 150. In some embodiments, the database 145 stores a number of pre-assigned caller identifiers and personalized outgoing audio messages, one or more of which is associated with a different caller or calling device, in one or more pre-assigned caller lists 155. In various embodiments, the network voicemail system 130 further prompts the caller of the second communication device 150 to leave an audio reply message for the user of the first communication device 105. The audio reply message is then stored within the database 145. In various embodiments, the user of the first communication device 105 may then retrieve and listen to the audio reply message from the caller of the second communication device 150 at a later time using the first communication device 105. In still other embodiments, the network voicemail system 130 may further convert the audio reply message into a text reply message and send the text reply message to the user of the first communication device 105. The user of the first communication device 105 may then view the text reply message using the first communication device 105. In still other embodiments, the text reply message may be sent to the user via an email message.

Figure 2:
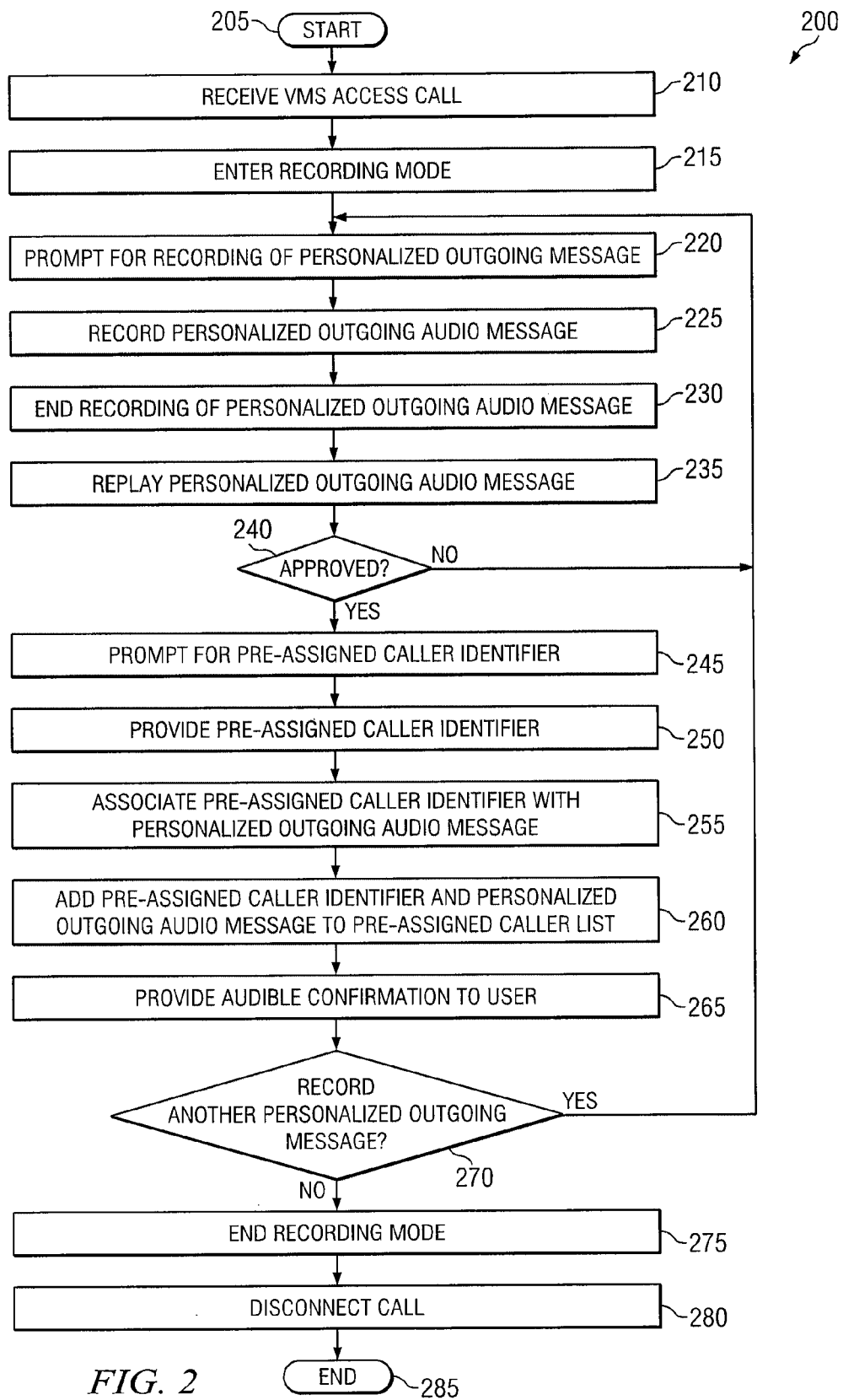
FIG. 2 illustrates an embodiment of a procedure for recording and assigning a personalized outgoing audio message to an incoming caller.

FIG. 2 illustrates an embodiment of a procedure 200 for recording and assigning a personalized outgoing audio message to an incoming caller. The procedure 200 begins at step 205. In step 210, the network voicemail system 130 receives a voicemail system access call from a user of the first communication device 105. The voicemail system access call allows the user to access the network voicemail system 130 to configure and/or access a voicemail account associated with the user. In step 215, the network voicemail system 130 enters a recording mode. In at least one embodiment, the recording mode is initiated by the user of the first communication device 105 pressing a predetermined key or a predetermined sequence of keys on the user interface 115 of the first communication device 105. In a particular embodiment, the pre-determined key or keys are dual tone multiple frequency (DTMF) keys.

In step 220, the user of the first communication device 105 is prompted by the network voicemail system 130 to record a personalized outgoing audio message directed to a particular caller, such as a caller associated with second communication devices 150. In step 225, the user records the personalized outgoing audio message using the handset 110 of first communication device 105, and the network voicemail system 130 stores the personalized outgoing message in the database 145. In step 230, the recording of the personalized outgoing audio message is ended. In a particular embodiment, the ending of the recording of the personalized outgoing message is indicated by the user pressing a DTMF key, such as the "#" or "*" key, on the user interface 110 of the first communication device 105. In step 235, the personalized outgoing audio message is replayed to the user. In step 240, the user is prompted for approval of the personalized outgoing audio message. If the user does not approve the personalized outgoing audio message, the procedure 200 returns to step 220. If the user approves the personalized outgoing message, the procedure 200 continues to step 245. In at least one embodiment, the user approves the personalized outgoing message by pressing the "1" key on the user interface 115, and disapproves the personalized outgoing message by pressing the "0" key on the user interface 115.

In step 245, the user is prompted for a pre-assigned caller identifier to which the personalized outgoing audio message recorded by the user is to be associated. In step 250, the user provides the pre-assigned caller identifier to the network voicemail system 130 using the first communication device 105. In at least one embodiment, the user provides the pre-assigned caller identifier by typing the pre-assigned caller identifier associated with the second communication device 150 using the user interface 115. In other embodiments, the user provides the pre-assigned caller identifier by selecting the pre-assigned caller identifier from a directory that has been previously saved in the database 145 by the network voicemail system 130. In one embodiment, the pre-assigned caller identifier is a phone number, which may be identified by receiving a Caller ID number, associated with the second communication device 150. In another embodiment, the pre-assigned caller identifier is a caller name, which may be identified by receiving a Caller ID name, associated with the second communication device 150. In still other embodiments, the user may provide the pre-assigned caller identifier by speaking a name or other identifying phrase associated with a caller or the second communication device 140 into the handset 110 of the first communication device 105. It should be understood that any identifier that may be communicated by or associated with the second communication device 150 or user thereof during a telephone call may be utilized as a pre-assigned caller identifier to associate with a personalized outgoing audio message.

In step 255, the pre-assigned caller identifier is associated with the personalized outgoing audio message by the network voicemail system 130. In step 260, the pre-assigned caller identifier and personalized outgoing audio message is added to a pre-assigned caller list 155 associated with the user stored in the database 145. The pre-assigned caller list 155 includes one or more personalized output audio messages and associated pre-assigned caller identifiers for one or more callers.

TABLE 1

| Pre-assigned Caller Identifier | Personalized Outgoing Audio Message |
| --- | --- |
| 972-555-1234 | "Bob, I'm at lunch. I'll call you when I return." |
| 214-555-8876 | "Sue, I'll see you tonight." |

In step 265, an audible confirmation indicating that the pre-assigned caller identifier and personalized outgoing audio message has been added to the pre-assigned caller list 155 is provided to the user via the handset 110 of the first communication device 105 by the network voicemail system 130. In at least one embodiment, the audible confirmation is a beep. In still other embodiments, the audible confirmation is a voice confirmation. In step 270, the user is prompted by the network voicemail system 130 via the first communication device 105 regarding whether he wishes to record another personalized outgoing audio message and associate the personalized outgoing message with another caller. If the user wishes to record another personalized outgoing audio message, the procedure 200 returns to step 220. If the user does not wish to record another personalized outgoing audio message, the procedure continues to step 275. At step 275, the network voicemail system 130 ends the recording mode. In step 280, the voicemail system access call is disconnected. In step 285, the procedure 200 ends.

Figure 3:
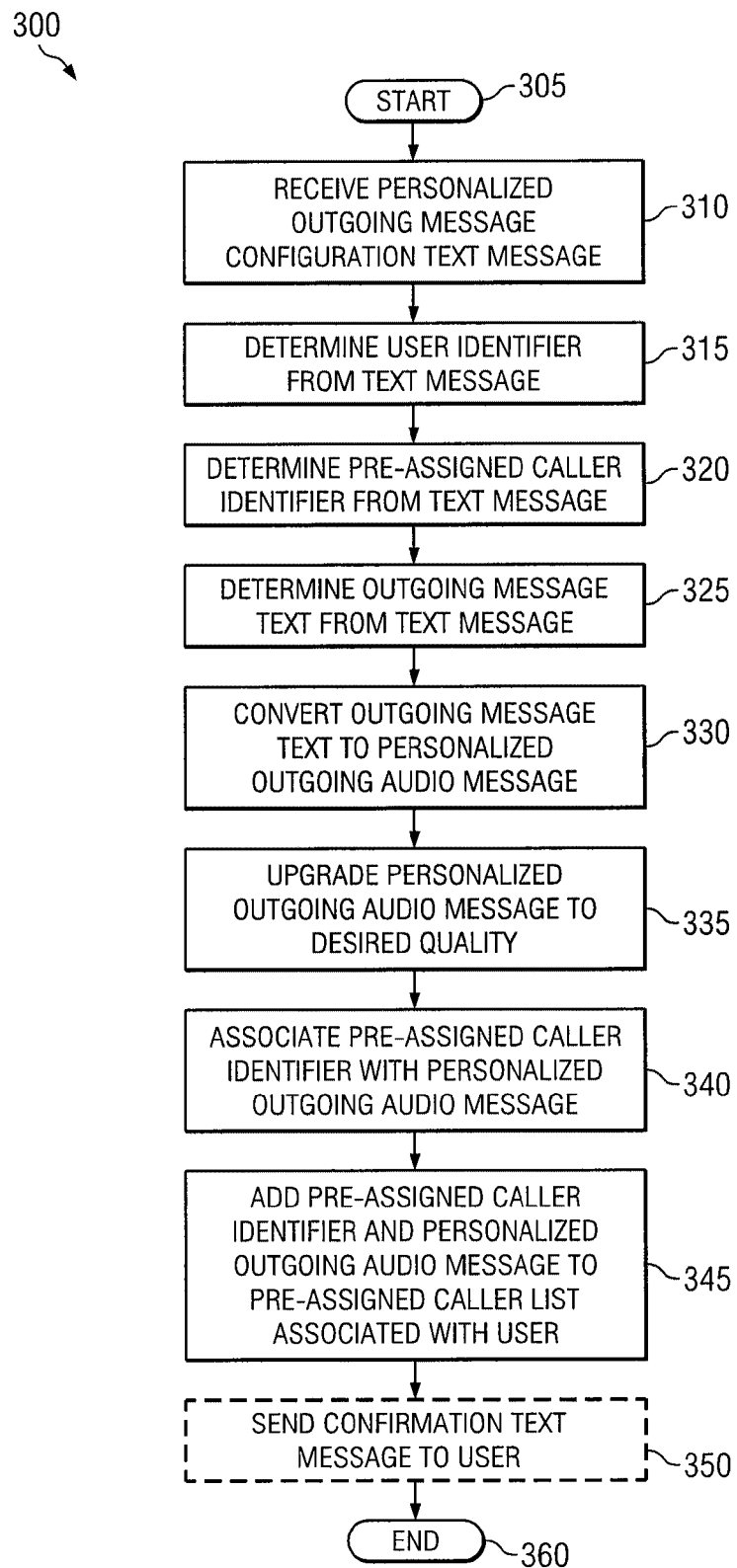
FIG. 3 illustrates an embodiment of a procedure for receiving a text message containing a personalized outgoing message, converting the personalized outgoing message to a personalized outgoing audio message, and assigning the personalized outgoing audio message to an incoming caller.

FIG. 3 illustrates an embodiment of a procedure 300 for receiving a text message containing a personalized outgoing message, converting the personalized outgoing message to a personalized outgoing audio message, and assigning the personalized outgoing audio message to an incoming caller. The procedure 300 is useful in situations in which the user wishes to record a personalized outgoing audio message for a caller, but is unable or does not wish to call into the network voicemail system 130 to do so. For example, the user may be in a meeting in which recording an audio outgoing message would disturb the meeting. In such a situation, the user may send a text message including message text to the network voicemail system 130, and the network voicemail system 130 converts the message text to a personalized outgoing audio message.

The procedure 300 begins at step 305. In step 310, a personalized outgoing message configuration text message from a user of the first communication device is received by the network voicemail system 130. The configuration text message includes a caller identifier and outgoing message text. In at least one embodiment, the configuration text message is a Short Message Service (SMS) message. In an alternative embodiment, the configuration text message is an e-mail. An example configuration text message according to one embodiment is a text message containing "214-555-1234. Bob, please call me after 3 pm", with "214-555-1234" representing the caller identifier and "Bob, please call me after 3 pm" representing the outgoing message text. In step 315, the network voicemail system 130 determines a user identifier from the text message. In at least one embodiment, the user identifier is a phone number associated with the first communication device 105. In step 320, the network voicemail system 130 determines the pre-assigned caller identifier from the text message. In at least one embodiment, the pre-assigned caller identifier is a phone number associated with the second communication device 150. In still other embodiments, the pre-assigned caller identifier is a name associated with the second communication device 150. In step 325, the network voicemail system 130 determines the outgoing message text from the text message. In step 330, the network voicemail system 130 converts the outgoing message text into a personalized outgoing audio message. In various embodiments, the network voicemail system 130 converts the outgoing message text into a personalized outgoing audio message using existing text-to-speech conversion procedures. In some embodiments, the user can specify whether the converted personalized outgoing audio message is to use either a male or female voice. In various embodiments, the user may specify a male or female voice within the text message. In the example described about, the network voicemail system converts the text "Bob, please call me after 3 pm" into a personalized outgoing audio message containing the phrase "Bob, please call me after 3 pm."

In an optional step 335, the network voicemail system 130 upgrades the personalized outgoing audio message to a desired quality level. In at least one embodiment, the upgrading of the audio outgoing message includes amplifying a signal level of the outgoing audio message to a predetermined threshold level. In an example operation, a difference between a current signal level of the outgoing audio message and the predetermined threshold level is determined, and the current signal level is amplified according to the difference value to set the signal level of the audio message to a desired level. In an example embodiment, the predetermined threshold level is set to a signal level as required by industry standards for the transmission of audio signals over a telephone network. In some embodiments, the upgrading of the outgoing audio message further includes reducing a noise level of the outgoing audio message to a desired level. In an example embodiment, the noise level of the outgoing audio message is reduced to less than 40 dBm.

In step 340, the network voicemail system 130 associates the pre-assigned caller identifier with the personalized outgoing audio message. In step 345, the network voicemail system 130 ends the pre-assigned caller identifier and the personalized outgoing audio message to a pre-assigned caller list 155 associated with the user of the first communication device 105. In some embodiments, the pre-assigned caller list 155 is stored in the database 145 by the network voicemail system 130. In an optional step 350, the network voicemail system 130 sends a confirmation text message to the user of the first communication device 105. The confirmation text message provides an indication to the user that the configuration text message was received by the network voicemail system 130 and that the personalized outgoing audio message has been associated with the pre-assigned caller identifier. In step 360, the procedure 300 ends.

Figure 4:
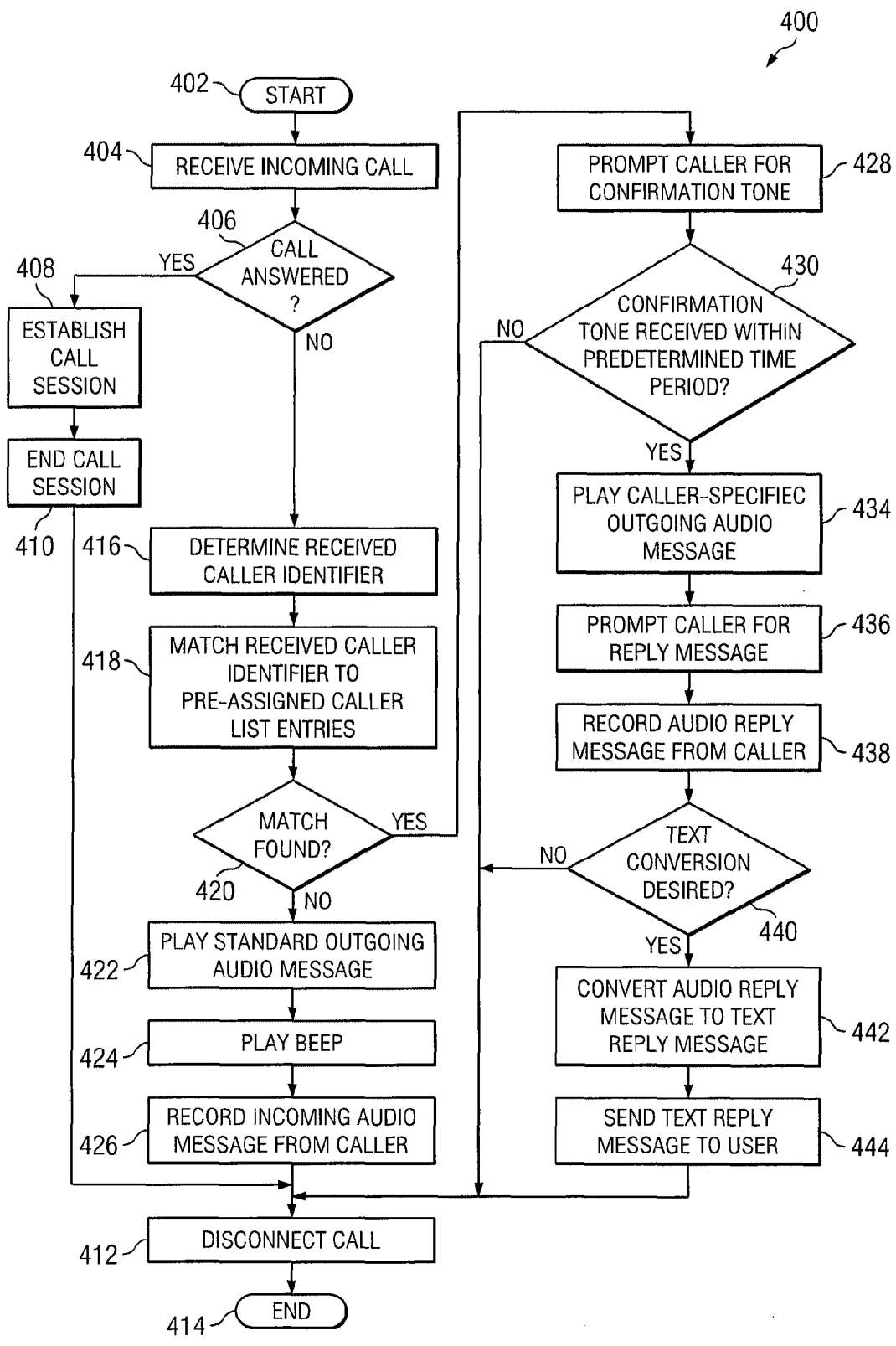
FIG. 4 illustrates an embodiment of a procedure for identifying an incoming caller and playing back a previously recorded personalized outgoing audio message to the incoming caller.

FIG. 4 illustrates an embodiment of a procedure 400 for identifying an incoming caller and playing back a previously recorded personalized outgoing audio message to the incoming caller. The procedure 400 begins at step 402. In step 404, the network voicemail system 130 receives an incoming call from a caller using second communication device 150 addressed to the user of the first communication device 105. In step 406, the network voicemail system 130 determines whether the call has been answered by the user of the first communication device 105. If the call has been answered by the user of the first communication device 105, the procedure continues to step 408 in which a call session is established between the first communication device 105 and the second communication device 150. In step 410, the call session is ended. In at least one embodiment, the call session is ended by either the user of the first communication device 105 or the caller of the second communication device 150 hanging up. From step 410, the procedure 400 continues to step 412 in which the call is disconnected. In step 414, the procedure 400 ends.

If the network voicemail system 130 determines at step 406 that the call has not been answered by the first communication device 105 within a predetermined period of time or a predetermined number of rings, the procedure continues to step 416. In step 416, the network voicemail system 130 determines a received caller identifier associated with a caller of the second communication device 150. In at least one embodiment, the received caller identifier is determined from caller ID information associated with the second communication device 150 received from the second communication device 150 during receipt of the incoming call. In a particular embodiment, the caller ID information includes caller ID type 1 information. Type 1 caller ID provides calling party information while the call is ringing.

In step 418, the network voicemail system 130 determines whether the received caller identifier matches one of the entries in the pre-assigned caller list 155. In step 420, the network voicemail system 130 determines if a match is found. If the network voicemail system 130 determines that a match has not been found in step 420, the procedure continues to step 422. In step 422, the network voicemail system 130 plays a standard outgoing audio message to the caller using the second communication device 150. An example of a standard outgoing message according to one embodiment is "I am not available right now, please leave a message." The network voicemail system 130 then plays a beep in step 424. After playing the beep, the network voicemail system 130 records an incoming audio message from the caller in step 426. After the caller records the incoming audio message, or if the caller has not recorded an incoming audio message within a predetermined time period, the procedure 400 continues to step 412. In step 412, the call is disconnected, and then to step 414 in which the procedure 400 ends.

If it is determined in step 420 that a match has been found, the procedure continues to step 428. In step 428, the caller may be prompted for a confirmation tone by the network voicemail system 130. In at least one embodiment, the confirmation tone is a DTMF tone generated by the caller of the second communication device 140 pressing a key on a keypad associated with the second communication device 150. In one example embodiment, the caller is prompted to press the "1" key if he wishes to leave an incoming message to a user of the first communication device 105. In step 430, if a confirmation tone is not received from the caller within a predetermined time period, the procedure continues to step 412 in which the call is disconnected, and to step 414 in which the procedure 400 ends. In step 430, if a confirmation tone is received from the caller within a predetermined time period, the procedure continues to step 434. In at least one embodiment, the predetermined time period is determined to comply with rules specified by the Federal Communications Commission (FCC). In a particular embodiment, the predetermined time period is 6 seconds. In still another embodiment, the predetermined time period is 4 seconds. In step 434, the network voicemail system 130 plays the personalized or caller-specific outgoing audio message associated with the pre-assigned caller identifier associated with the second communication device 150. In step 436, the network voicemail system 130 prompts the caller for recording an audio reply message. In step 438, the caller records the audio reply message. In at least one embodiment, if the caller does not record an audio reply message within a predetermined time period, the call is disconnected and the procedure 400 ends.

In step 470, the network voicemail system 130 determines whether text conversion of the audio reply message is desired. In at least one embodiment, whether text conversion of the audio reply message is desired is determined by the user of the first communication device 105. If it is determined that text conversion is not desired in step 470, the procedure continues to step 412 in which the call is disconnected, and the procedure 400 ends in step 414. If it is determined in step 470 that text conversion of the audio reply message is desired, the procedure continues to step 442. In step 442, the audio reply message from the caller is converted into a text reply message. In various embodiments, the conversion of the audio reply message to a text reply message is performed in accordance with existing audio-to-text conversion procedures. In step 444, the text reply message is sent to the user of the first communication device 105. In at least one embodiment, the user can specify a communication device, such as first communication device 105, to which the text reply message is to be sent. In still other embodiments, the user may specify an e-mail address to which the text reply message is to be sent. At a later time, the user of the first communication device 105 can view the text reply message to read the contents contained in the audio reply message in a text form. In step 414, the procedure 400 ends. In an alternative embodiment, the network voicemail system 130 may send a notification message to the user instead of a text reply message in step 444. The notification message indicates to the user that an audio reply message has been recorded by the caller. At a later time, the user may access the network voicemail system to listen to the audio reply message.

Figure 5:
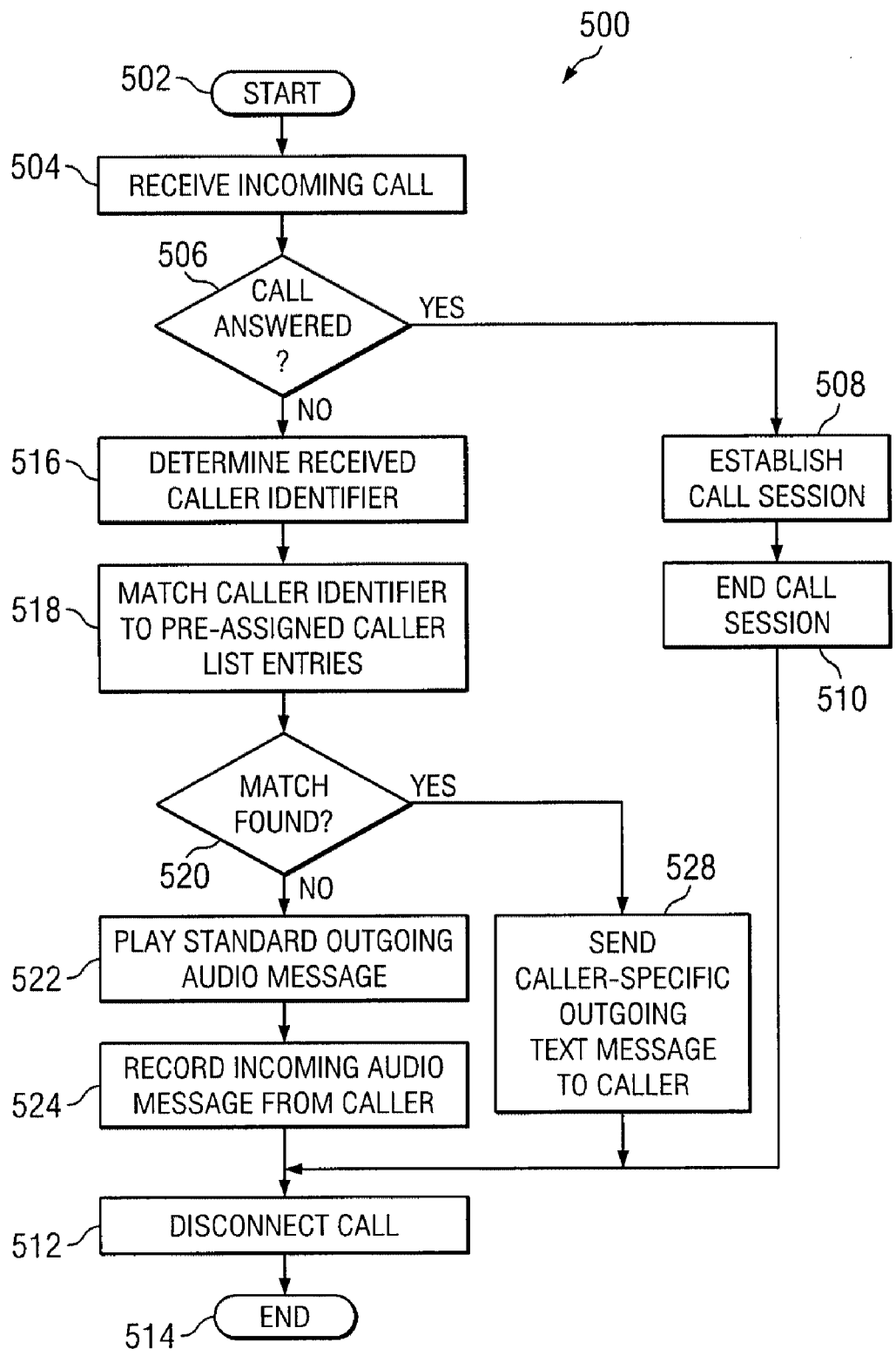
FIG. 5 illustrates an embodiment of a procedure for identifying an incoming caller and sending a previously stored personalized outgoing text message to the incoming caller.

FIG. 5 illustrates an embodiment of a procedure 500 for identifying an incoming caller and sending a previously stored personalized outgoing text message to the incoming caller. In the example embodiment of FIG. 5, the user may wish to send a personalized outgoing text message to a particular caller instead of playing a personalized outgoing audio message to the caller as described in FIG. 4. In such an embodiment, the user may send a text message containing a pre-assigned caller identifier and outgoing message text to the network voicemail system 130 prior to the caller calling the user. The network voicemail system 130 then associates the outgoing message text with the pre-assigned caller identifier and adds the outgoing message text and the pre-assigned caller identifier to the pre-assigned caller list 155.

The procedure 500 begins at step 502. In step 504, the network voicemail system 130 receives an incoming call from a caller using second communication device 150 addressed to the user of the first communication device 105. In step 506, the network voicemail system 130 determines whether the call has been answered by the user of the first communication device 105. If the call has been answered by the user of the first communication device 105, the procedure continues to step 508 in which a call session is established between the first communication device 105 and the second communication device 150. In step 510, the call session is ended. In at least one embodiment, the call session is ended by either the user of the first communication device 105 or the caller of the second communication device 150 hanging up. From step 510, the procedure 500 continues to step 512 in which the call is disconnected. In step 514, the procedure 500 ends.

If the network voicemail system 130 determines at step 506 that the call has not been answered by the first communication device 105 within a predetermined period of time or a predetermined number of rings, the procedure continues to step 516. In step 516, the network voicemail system 130 determines a received caller identifier associated with a caller of the second communication device 150. In step 518, the network voicemail system 130 determines whether the received caller identifier matches one of the entries in the pre-assigned caller list 155. In step 520, the network voicemail system 130 determines if a match is found. If the network voicemail system 130 determines that a match has not been found in step 520, the procedure continues to step 522. In step 522, the network voicemail system 130 plays a standard outgoing audio message to the caller using the second communication device 150. In step 524, the network voicemail system 130 records an incoming audio message from the caller. The procedure 500 then continues to step 512 in which the call is disconnected, and then to step 514 in which the procedure ends. If it is determined in step 520 that a match has been found, the procedure continues to step 528. In step 528, the network voicemail system 130 sends a caller-specific outgoing text message to the caller associated with the second communication device 150. In at least one embodiment, the network voicemail system 130 sends the caller-specific outgoing text message to the second communication device 150. In an example embodiment, the caller-specific outgoing text message includes the text "I'm in a meeting. I'll call you when it's over." From step 528, the procedure 500 continues to step 512 in which the call is disconnected, and step 514 in which the procedure 500 ends.

Figure 6:
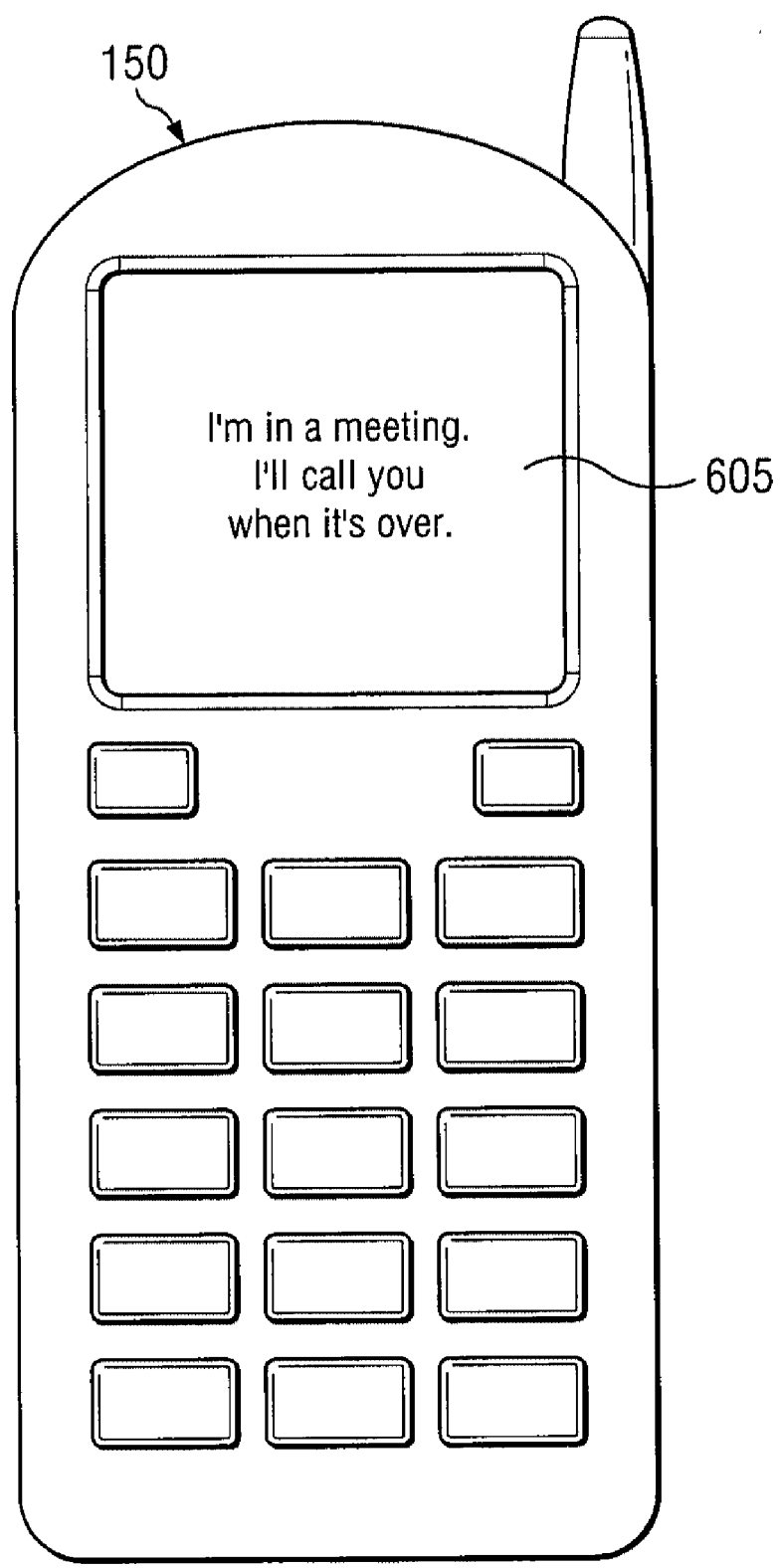
FIG. 6 is an embodiment of the second communication device for displaying the caller-specific outgoing text message of FIG. 5.

FIG. 6 is an embodiment of the second communication device 150 for displaying the caller-specific outgoing text message of FIG. 5. In the embodiment of FIG. 6, the second communication device 150 is a mobile phone having text messaging capabilities. The second communication device 150 includes a display 605 for displaying text messages received by the second communication device 150. In the embodiment illustrated in FIG. 6, the second communication device has received a caller-specific outgoing text message including the text "I'm in a meeting. I'll call you when it's over." from the network voicemail system 130. The text of the text message is then displayed by the display 605.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate or transport the program for use by or in connection with the instruction execution system, apparatus or device. In various embodiments, the network voicemail system 130 includes one or more processors 135 operable to execute computer executable instructions from a computer-usable or computer-readable medium to perform the various capabilities of network voicemail system 130 described herein.

The computer-usable or computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for assigning a personalized greeting to a caller comprising:
   receiving a text message from a first communication device;
   determining a pre-assigned caller identifier from the text message;
   determining outgoing message text from the text message;
   converting the outgoing message text into an outgoing audio message; and
   associating the outgoing audio message with a pre-assigned caller identifier.

2. The method of claim 1 further comprising:
   determining a user identifier associated with a user of the first communication device; and adding the outgoing audio message and the associated pre-assigned caller identifier to a pre-assigned caller list associated with the user.

3. The method of claim 1 further comprising amplifying a signal level of the outgoing audio message to a predetermined threshold level.

4. The method of claim 1 further comprising reducing a noise level of the outgoing audio message to a desired level.

5. The method of claim 1 further comprising sending a confirmation text message to the user indicating that outgoing audio message has been associated with the pre-assigned caller identifier.

6. The method of claim 1 further comprising:
receiving an incoming call addressed to a first communication device from a caller using a second communication device;
determining a received caller identifier associated with the second communication device; and
determining if the received caller identifier matches the pre-assigned caller identifier.

7. The method of claim 6 further comprising playing the outgoing audio message associated with the pre-assigned caller identifier if the received caller identifier matches the pre-assigned caller identifier.

8. The method of claim 7 further comprising:
recording an audio reply message from the caller;
converting the audio reply message into a text reply message; and
sending the text reply message to a user associated with the first communication device.

9. The method of claim 6 further comprising playing a standard outgoing audio message if the received caller identifier does not match the pre-assigned caller identifier.

10. A system for assigning a personalized greeting to a caller, said system comprising:
a processing unit configured to:
receive a text message from a first communication device;
determine a pre-assigned caller identifier from the text message;
determine outgoing message text from the text message;
convert the outgoing message text into an outgoing audio message; and
associate the outgoing audio message with a pre-assigned caller identifier.

11. The system of claim 10, wherein the processing unit is further configured to:
determine a user identifier associated with a user of the first communication device; and
add the outgoing audio message and the associated pre-assigned caller identifier to a pre-assigned caller list associated with the user.

12. The system of claim 10, wherein the processing unit is further configured to amplify a signal level of the outgoing audio message to a predetermined threshold level.

13. The system of claim 10, wherein the processing unit is further configured to reduce a noise level of the outgoing audio message to a desired level.

14. The system of claim 10, wherein the processing unit is further configured to send a confirmation text message to the user indicating that outgoing audio message has been associated with the pre-assigned caller identifier.

15. The system of claim 10, wherein the processing unit is further configured to:
receive an incoming call addressed to a first communication device from a caller using a second communication device;
determine a received caller identifier associated with the second communication device; and
determine if the received caller identifier matches the pre-assigned caller identifier.

16. The system of claim 15, wherein the processing unit is further configured to play the outgoing audio message associated with the pre-assigned caller identifier if the received caller identifier matches the pre-assigned caller identifier.

17. The system of claim 16, wherein the processing unit is further configured to:
record an audio reply message from the caller;
convert the audio reply message into a text reply message; and
send the text reply message to a user associated with the first communication device.

18. The system of claim 6, wherein the processing unit is further configured to play a standard outgoing audio message if the received caller identifier does not match the pre-assigned caller identifier.

\* \* \* \* \*